(12) United States Patent
Storer

(10) Patent No.: US 10,999,534 B2
(45) Date of Patent: May 4, 2021

(54) OPTIMIZED VIDEO REVIEW USING MOTION RECAP IMAGES

(71) Applicant: Cisco Technology, Inc., San Jose, CA (US)

(72) Inventor: Nathaniel Webster Storer, Pacifica, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 24 days.

(21) Appl. No.: 16/406,516

(22) Filed: May 8, 2019

(65) Prior Publication Data

US 2020/0314356 A1 Oct. 1, 2020

Related U.S. Application Data

(60) Provisional application No. 62/826,960, filed on Mar. 29, 2019.

(51) Int. Cl.
*H04N 5/272* (2006.01)
*G06T 7/215* (2017.01)
(Continued)

(52) U.S. Cl.
CPC ............ *H04N 5/272* (2013.01); *G06F 16/735* (2019.01); *G06F 16/738* (2019.01); *G06T 7/194* (2017.01);
(Continued)

(58) Field of Classification Search
CPC ............ G06K 9/00711; G06K 9/00718; G06K 9/00744; G06K 9/00751; G06T 7/194; G06T 7/20; G06T 7/215; G06T 7/254; G06T 7/50; G06T 7/97; G06T 2207/20024; G06T 2207/20224; G06T 2207/30232; G06F 16/73; G06F 16/735; G06F 16/738; G06F 16/739; H04N 5/232
See application file for complete search history.

(56) References Cited

U.S. PATENT DOCUMENTS

| 6,665,342 | B1 | 12/2003 | Brown et al. ............ 375/240.16 |
| 2010/0092037 | A1 | 4/2010 | Peleg et al. ................... 382/103 |

(Continued)

OTHER PUBLICATIONS

International Search Report and Written Opinion from the International Searching Authority, dated Jul. 10, 2020, 13 pages, for corresponding International Patent Application No. PCT/US2020/025305.

(Continued)

*Primary Examiner* — Andrew W Johns
(74) *Attorney, Agent, or Firm* — Polsinelli PC

(57) ABSTRACT

Systems and methods provide for optimizing video review using motion recap images. A video review system can identify background image data of a video clip including an amount of motion satisfying a motion threshold. The video review system can generate foreground mask data segmenting foreground image data, representing a moving object in the video clip, from the background image data. The video review system can select a set of instances of the moving object represented in the foreground image data. The video review system can generate a motion recap image by superimposing the set of instances of the moving object represented in the foreground image data onto the background data.

20 Claims, 12 Drawing Sheets

(51) Int. Cl.
  *G06T 7/194*  (2017.01)
  *G06T 7/50*  (2017.01)
  *G06T 7/254*  (2017.01)
  *G06F 16/738*  (2019.01)
  *G06F 16/735*  (2019.01)
  *G06F 3/0482*  (2013.01)

(52) U.S. Cl.
  CPC .............. *G06T 7/215* (2017.01); *G06T 7/254* (2017.01); *G06T 7/50* (2017.01); *G06F 3/0482* (2013.01); *G06T 2207/10016* (2013.01); *G06T 2207/20024* (2013.01); *G06T 2207/20224* (2013.01); *G06T 2207/30232* (2013.01)

(56) References Cited

U.S. PATENT DOCUMENTS

| | | | |
|---|---|---|---|
| 2012/0002112 A1* | 1/2012 | Huang et al. | H04N 5/2625 348/579 |
| 2013/0163961 A1 | 6/2013 | Wu et al. | 386/280 |
| 2017/0040036 A1 | 2/2017 | Ryu et al. | G11B 27/031 |
| 2017/0344832 A1* | 11/2017 | Leung et al. | G06K 9/00342 |

OTHER PUBLICATIONS

Irani, Michal, et al., "Video Indexing Based on Mosaic Representations," Proceedings of the IEEE, vol. 86, No. 5, May 1, 1998, pp. 905-921.

* cited by examiner

OPTIMIZED VIDEO REVIEW USING MOTION RECAP IMAGES

CROSS-REFERENCE TO RELATED APPLICATIONS

This application claims the benefit of priority of U.S. Provisional Application No. 62/826,960, filed on Mar. 29, 2019, the contents of which are incorporated herein by reference in its entirety.

TECHNICAL FIELD

The subject matter of this disclosure relates in general to the field of computer vision, and more specifically for systems and methods for optimizing video review using motion recap images.

BACKGROUND

Security cameras are often necessary to keep locations, such as homes, businesses, and other places that may be important to users, safe, secure, and operating smoothly. However, the time and expense to review video footage from the security cameras can be prohibitive for both consumers and enterprises alike. For example, inspecting video to identify "interesting" events can involve streaming and analyzing hours or even days of footage, and can thus be a painstaking and resource-intensive process for users. Some security camera systems may be capable of excerpting clips meeting certain criteria of interest. But reviewing these clips can still come at a high cost in terms of time, money, and other resources (e.g., Central Processing Unit (CPU), memory, storage, bandwidth, power, etc.) when there are a large number of clips and/or individual clips are lengthy.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
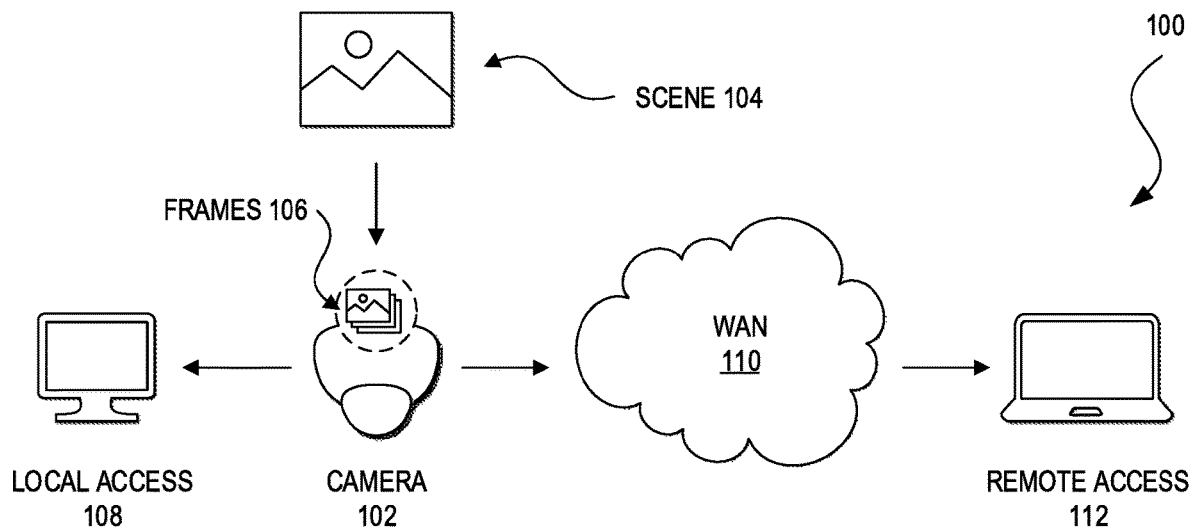
FIGS. 1A-1B illustrate block diagrams of an example of a network environment and a video review system in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for optimizing video review using motion recap images. A video review system can identify background image data of a video clip including an amount of motion satisfying a motion threshold. The video review system can generate foreground mask data segmenting foreground image data, representing a moving object in the video clip, from the background image data. The video review system can select a set of instances of the moving object represented in the foreground image data. The video review system can generate a motion recap image by superimposing the set of instances of the moving object represented in the foreground image data onto the background data.

Description

Current video review systems exist that can provide full digital solutions for designing surveillance systems, beginning with the sensors that capture raw data (e.g., image, audio, video (e.g., image and audio), Infrared (IR), thermal, motion, etc.) to the presentation of relevant information for review by users. Some of these video review systems may also be capable of automatically detecting events of interest, such as video clips that include (or exclude) motion, persons or other objects of interest, anomalies, and so forth. However, the volume of video generated by these conventional systems that must be reviewed can be burdensome for users and taxing on resources (e.g., CPU, memory, storage, bandwidth, power, etc.).

Various embodiments of the present disclosure may overcome the above and other deficiencies of the prior art by generating motion recap images for more efficient review of video data. The motion recap images can comprise still images that summarize the motion in a video clip by superimposing or stacking instances of a moving object from multiple image frames onto a single frame. This can enable a user to glance at one or more motion recap images to determine whether to further investigate their corresponding video clips. The user can quickly skip over video clips of little to no interest, and the video review system can operate more efficiently by decreasing utilization of CPU, memory, storage, bandwidth, and so forth, that would otherwise be consumed for processing the video clips. In some embodiments, generation of the motion recap images can occur locally. This can ensure efficient video review is available even in the event of network failure, provide for increased privacy and security, and further improve resource utilization by eliminating the need for server and Graphic Processing Unit (GPU) farms in the cloud. Instead of a conventional thumbnail image consisting of a single frame that may not immediately convey the relevance of a video clip and requiring video playback, the present technology can generate a motion recap image that summarizes the contents of the video clip. Numerous other functions and advantages are described and suggested below as may be provided in accordance with the various embodiments.

FIG. 1A illustrates a block diagram of an example of a network environment 100 in which a video review system can be deployed. One of ordinary skill in the art will understand that, for the network environment 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network environment 100 can include one or more cameras 102 (e.g., video cameras, box cameras, dome cameras, Point Tilt Zoom (PTZ) cameras, bullet cameras, C-mount cameras, Internet Protocol (IP) cameras, Long-Term Evolution (LTE™) cameras, day/night cameras, thermal cameras, wide dynamic cameras, Closed-Circuit Television (CCTV) cameras, Network Video Recorders (NVRs), wireless cameras, smart cameras, indoor cameras, outdoor cameras, etc.) configured for recording data of a scene 104, including image data as a series of frames 106, audio data (not shown), and other sensor data (e.g., IR, thermal, motion, etc.) (not shown). In some embodiments, Cisco Meraki® MV series cameras may be deployed as the cameras 102.

The network environment 100 also includes one or more computing devices 108 for providing local access to the data captured by the cameras 102. The computing devices 108 can be general purpose computing devices (e.g., servers, workstations, desktops, laptops, tablets, smart phones, etc.), wearable devices (smart watches, smart glasses or other smart head-mounted devices, smart ear pods or other smart in-ear, on-ear, or over-ear devices, etc.), televisions, digital displays, and any other electronic devices that are capable of connecting to or are integrated with the cameras 102 and incorporating input/output components to enable a user to locally access the cameras' data.

The network environment can also include a Wide-Area Network (WAN) 110. In general, the WAN 110 can connect geographically dispersed devices over long-distance communications links, such as common carrier telephone lines, optical light paths, synchronous optical networks (SONETs), synchronous digital hierarchy (SDH) links, Dense Wavelength Division Multiplexing (DWDM) links, and so forth. The WAN 110 may be a private network, such as a T1/E1, T3/E3, or other dedicated or leased line network; a Public Switched Telephone Network (PSTN), Integrated Services Digital Network (ISDN), or other circuit-switched network; Multi-Protocol Label Switching (MPLS), Ethernet WAN (also sometimes referred to as Metropolitan Ethernet or MetroE, Ethernet over MPLS or EoMPLS, Virtual Private Local Area Network (LAN) Service (VPLS), etc.), Frame Relay, Asynchronous Transfer Mode (ATM), or other packet-switched network; Very Small Aperture Terminal (VSAT) or other satellite network; and so forth.

The WAN 110 can also be a public network, such as the Internet. The Internet can connect disparate networks throughout the world, providing global communication between devices on various networks. The devices may communicate over the network by exchanging discrete frames or packets of data according to predefined protocols, such as the Transmission Control Protocol/Internet Protocol (TCP/IP). Access to the Internet can be provided over a Digital Subscriber Line (DSL), cable, fiber, or wirelessly, such as via Municipal Wi-Fi, Worldwide Interoperability for Microwave Access (WiMAX), satellite Internet, or a cellular network (e.g., 3G, 4G, 5G, etc.), among other possibilities.

In some embodiments, the cameras 102 may use the WAN 110 to connect to a cloud-based network management system to provide additional services, such as centralized management of network devices (e.g., routers, switches, access points, security appliances, gateways, etc.), Software-Defined WANs (SD-WANs), Wireless Local Area Network (WLANs), endpoints (e.g., computing devices, IP phones, etc.), and so forth. In some embodiments, the Cisco Meraki® platform may be used for the cloud-based management system. The Cisco Meraki® platform may be especially advantageous because it can also provide various advanced camera features, such as zero-touch configuration, cloud-augmented edge storage, security patching and software updates, video archival, video search indexing, and remote access (e.g., access by one or more computing devices 112 not locally connected to the cameras 102), among other functionalities.

Figure 1B:
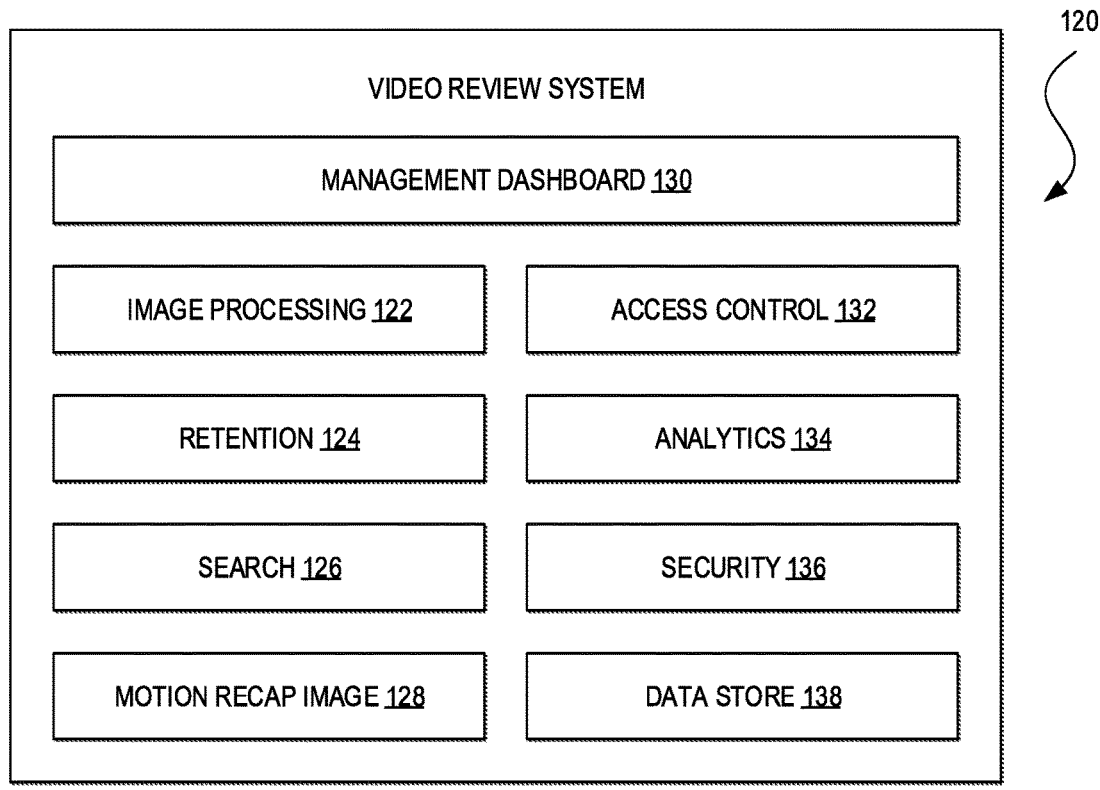

FIG. 1B illustrates a block diagram of an example of a video review system 120. In some embodiments, the video review system 120 may be physically integrated with the cameras 102. In other embodiments, some or all of the functionality of one or more modules of the video review system 120 may be additionally or alternatively implemented by the computing devices 108 or 112, one or more computing devices of a cloud-based management system accessible via the WAN 110, and the like. In this example, the video review system 120 includes an image processing module 122, a data retention module 124, a search module 126, a motion recap image module 128, a management dashboard 130, an access control module 132, an analytics module 134, a security module 136, and a data store 138.

The image processing module 122 can process image data of the scene 104 captured by image sensors (not shown) of the cameras 102 to generate and store the frames 106, such as in the data store 138 and/or a remote data store accessible via the WAN 110. In addition, the image processing module 122 can analyze the frames 106 to detect motion occurring within the scene 104. As discussed in further detail below, motion can be detected by calculating a sum of absolute differences between the frames 106 on a frame-by-frame basis. Motion can then be indexed based on various indicators, such as a timestamp, duration, and/or an intensity associated with the frame. Subsequently, data describing the motion ("motion metadata") may be stored, such as in the data store 138 and/or a remote data store accessible via the WAN 110.

In some embodiments, the image processing module 122 can analyze the frames 106 locally to detect motion and index the video with the motion metadata and other metadata remotely. This hybrid-based approach can provide users maximum flexibility over how to store camera data. For example, the data retention module 124 can enable users to select a video bit rate and frame rate to find the optimal balance between storage length and image quality. In some embodiments, the data retention module 124 can also support cloud-augmented edge storage by storing a configurable amount of footage and motion metadata locally (e.g., the last 72 hours) before intelligently trimming stored video that may not include any motion. The data retention module 124 can also support scheduled recording to control if and when the cameras 102 are recording. In addition, the data retention module 124 can allow users to create schedule templates that may be applied to groups of cameras and to store only the data that may be needed. Recording can also be turned off altogether and live footage may be reviewed for selective privacy. The data retention module 124 can also provide real-time retention estimates for how long certain video data may be stored locally and/or remotely.

The search module 126 can be used to facilitate queries relating to video data, including motion search queries requesting for any of the frames 106 or sets of the frames (e.g., sequences or clips) that may include motion. For example, the search module 126 can enable a user to provide a motion search query (e.g., as input to the cameras 102, the computing devices 108 or 112, etc.). The search query can be used to search the data store 138 or transmitted for processing by a remote server accessible via the WAN 110. As discussed in further detail below, the motion search query can include boundary conditions indicating a particular area or region within the frames in which motion events are to be searched. By permitting users to specify a particular "region of interest" for their motion search query, video data can be efficiently searched only for events occurring at indicated locations of interest, increasing the speed and efficiency of the search, as well as reducing overhead due to processing and other resources.

The motion recap image module 128 can generate one or more motion recap images from the search results or video clips responsive to the motion search query.

The management dashboard 130 can provide a user interface for configuring the cameras 102 and accessing camera data. In some embodiments, the management dashboard 130 may be integrated with the user interface of a cloud-based management system, such as the Cisco Meraki® dashboard. Integration with the Cisco Meraki® dashboard may be especially advantageous because of some of the features the dashboard can provide, such as zero-touch configuration (e.g., using just serial numbers, an administrator can add devices to the dashboard and begin configuration even before the hardware arrives on site, users can stream video and configure cameras across multiple locations without having to configure an IP or installing a plugin, etc.), remote troubleshooting, centralized management, and the video wall.

The access control module 132 can provide differentiated access to users with granular controls appropriate for their particular roles. For example, the access control module 132 can give a receptionist access to a video camera located at the front door but may not give him/her full camera configuration privileges, prevent security staff from changing network settings, limit views to selected cameras, restrict the export of video, and so forth. In some embodiments, the access control module 132 can also support Security Assertion Markup Language (SAML).

The analytics module 134 can provide the video review system 120 with various data science, computer vision, and machine learning capabilities, such as real-time and/or historical data analytics, heat maps, and person detection features. For example, the analytics module 134 can provide Message Queuing Telemetry Transport (MQTT) and Restful State Transfer (REST) Application Programming Interfaces (API) endpoints to enable organizations to integrate the edge-computing capabilities of the cameras 102 into the organizations' software systems, and provide the organizations with high-value (real-time and/or historical data) and insights without additional infrastructure. REST is a design pattern in which a server enables a client to access and interact with resources via Uniform Resource Identifiers (URIs) using a set of predefined stateless operations (referred to as endpoints).

MQTT is a client-server publish/subscribe messaging transport protocol that is lightweight, open, simple, and designed to be easy to implement. These characteristics can make it ideal for use in constrained environments, such as for communication in Machine-to-Machine (M2M) and Internet of Things (IoT) contexts where a small code footprint may be required or network bandwidth is at a premium. The MQTT protocol can run over TCP/IP, or over other network protocols that provide ordered, lossless, bi-directional connections.

The analytics module 134 can also generate heat maps. For example, the analytics module 134 can use motion metadata to generate the heat maps to show an overview of historical motion, such the last week's worth of motion data, on a per-day or per-hour basis, to help users understand how a space is being used. The analytics module 134 can present a series of heat maps for each unit of time per selected resolution (e.g., 1 hour, 1 day, etc.). Areas of motion observed across the heat maps in this series can be given an absolute value relative to the total amount of motion. The analytics module 134 can display a range of colors to indicate motion in the area, such as from red to indicate a large amount of motion, green to indicate small amount of motion, and orange to yellow to indicate amounts of motion in between. Areas where very little or no motion may not be represented, as they may be insignificant compared to motion observed in other areas.

Person detection features can include the ability to detect persons in video data from a camera feed. For example, objects detected as persons may be enclosed by yellow boxes. The analytics module 134 can also generate histograms of people detected by the cameras 102 (e.g., per camera, per set of cameras, or for all cameras) and record statistics about how many persons entered or were present in a location at a specified time (e.g., per minute, hour, day, etc.), the hour or other time period that the location was most utilized, peak occupancy, total entrances, and so forth. The analytics module 134 can also identify anomalies when usage differs from historical trends.

The security module 136 can provide features such as Public Key Infrastructure (PKI) encryption for each camera 102 of the video review system 120 and two-factor authentication for access to the video review system 120. The security module 136 can also ensure that local video is encrypted by default to provide an additional layer of security that cannot be deactivated. In addition, the security module 136 can automatically manage software updates and security patches according to scheduled maintenance windows.

The data store 138 can be used for saving video, motion metadata, and so forth. In some embodiments, the data store 138 may be implemented using Solid State Devices (SSDs) on each camera 102. This can ensure that camera data continues to be recorded even when there is no network connectivity. In some embodiments, the data store 138 may also be configured using a distributed architecture such that the storage of the video review system 120 can scale with the addition of each camera 102 and to support high availability/ failover protection.

Figure 2A:
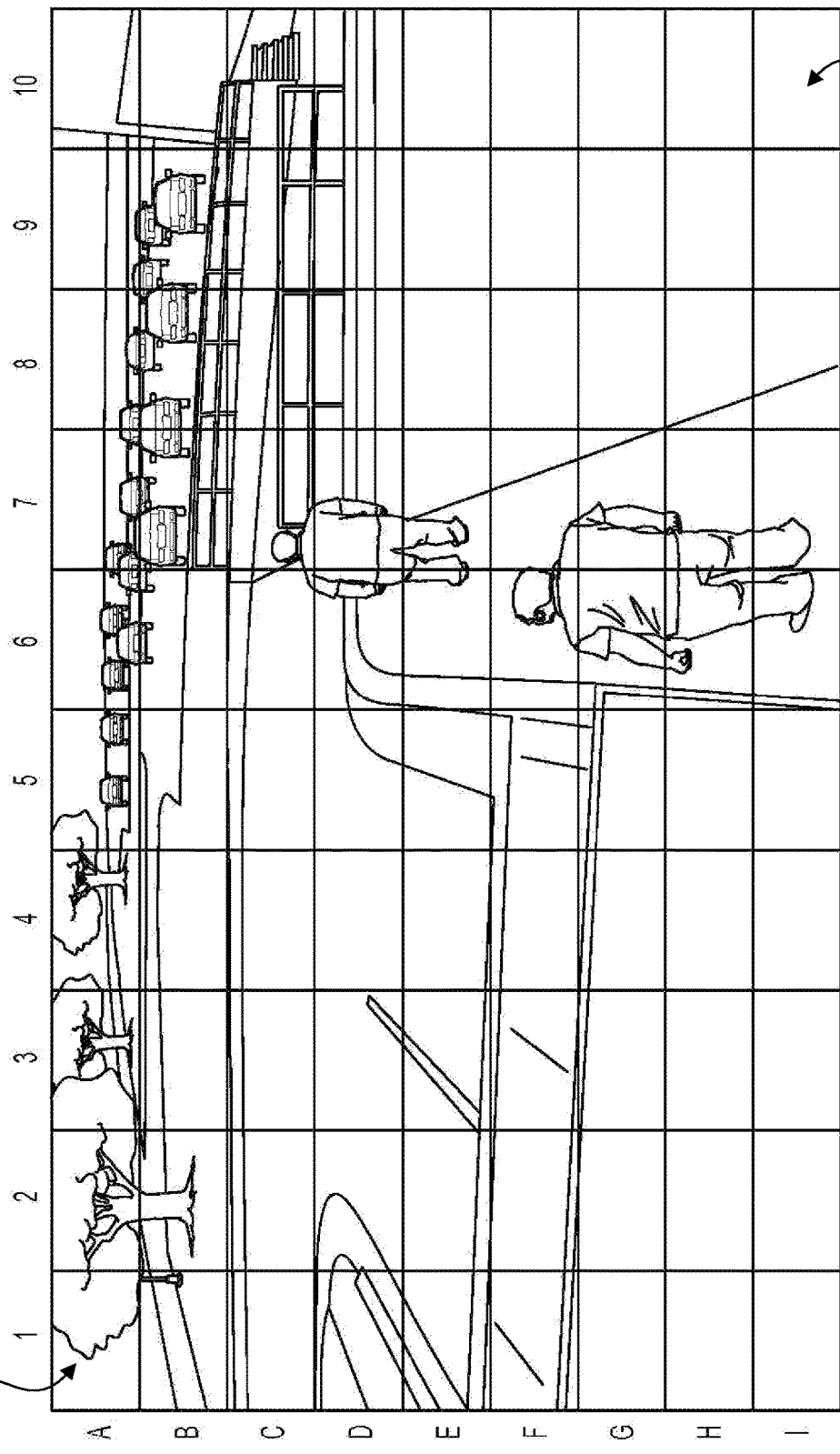
FIGS. 2A-2C illustrate an example of an approach for processing video to identify video clips of interest in accordance with an embodiment.
Figure 2B:
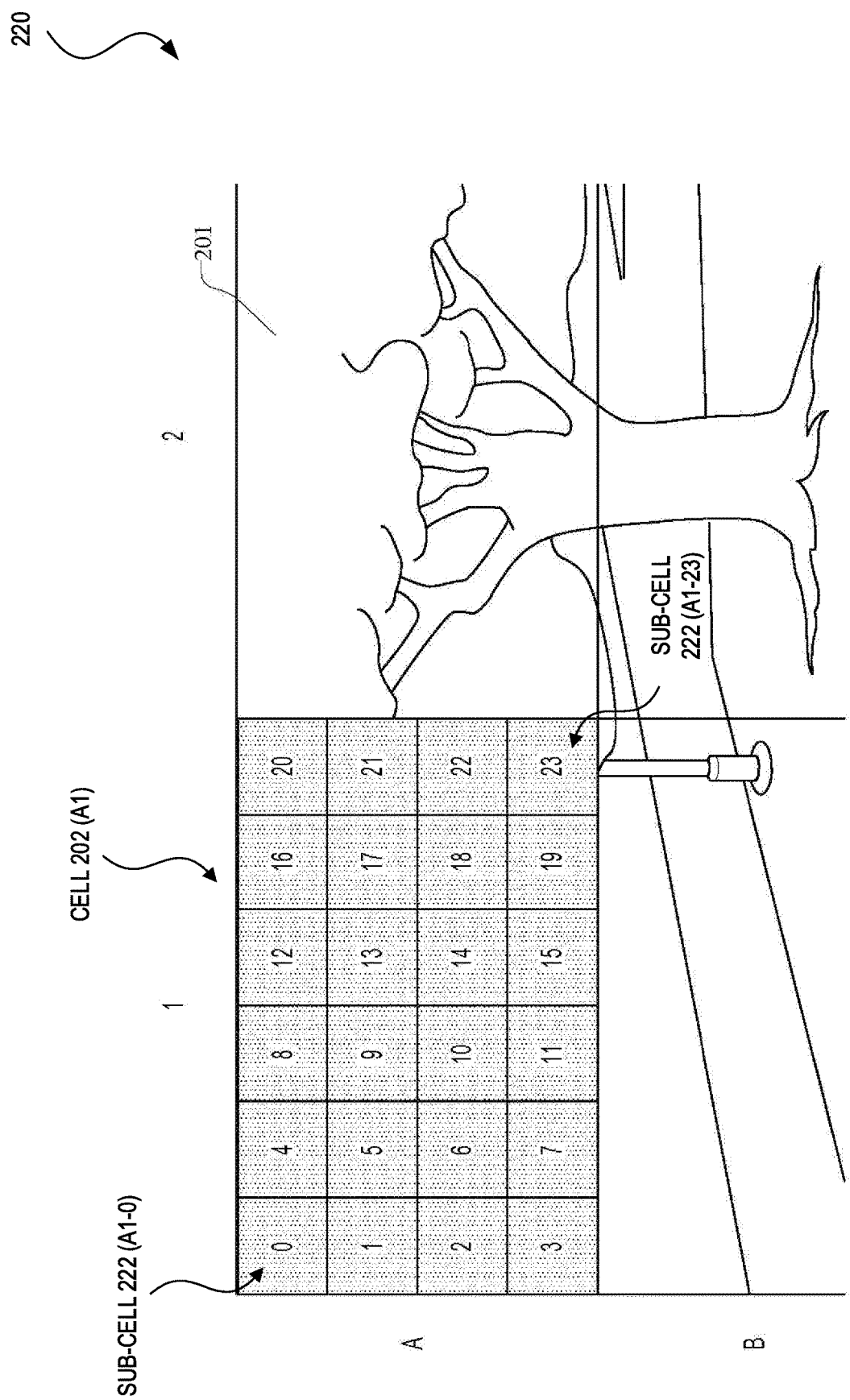
Figure 2C:
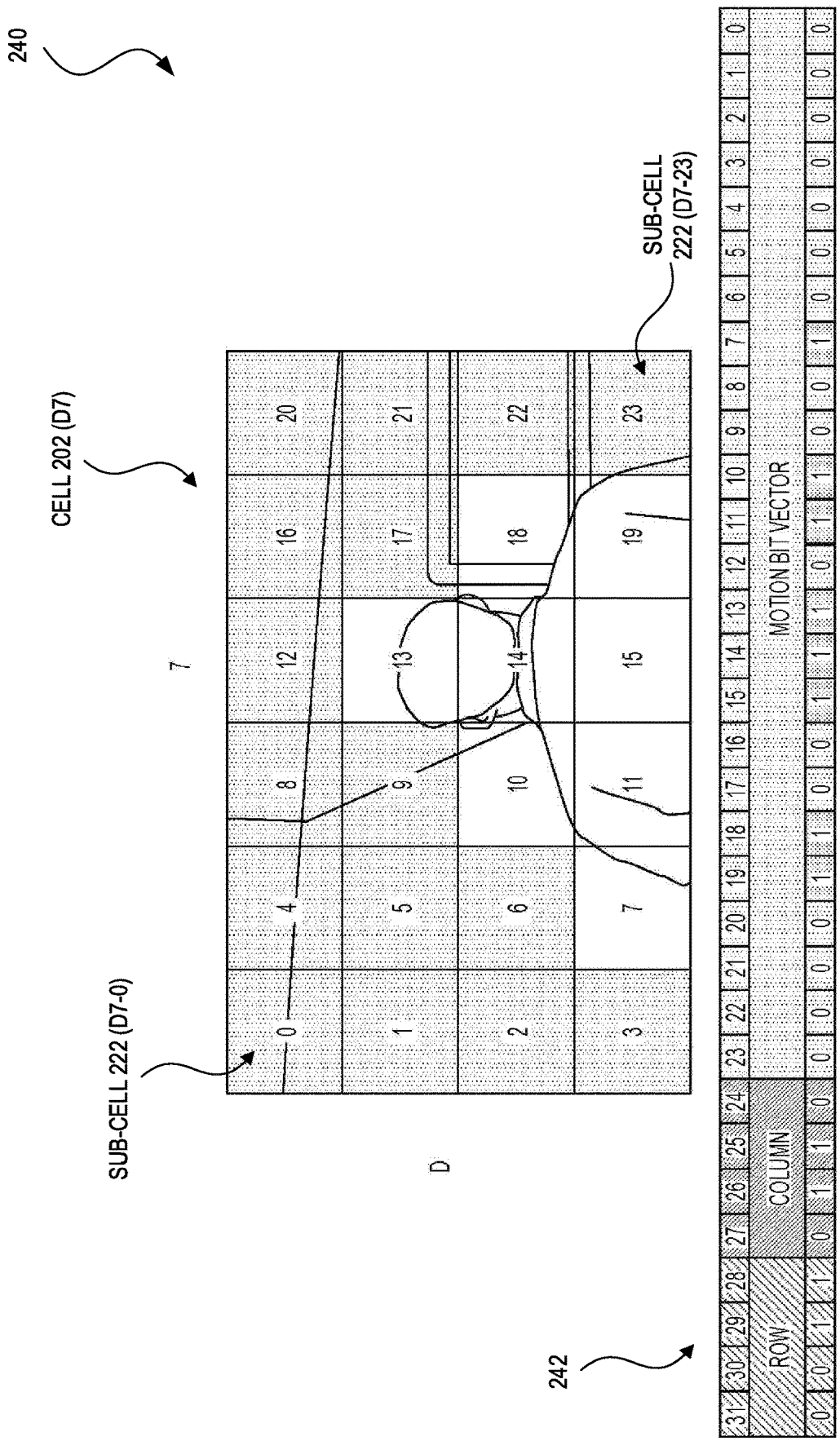

FIGS. 2A-2C illustrate an example of an approach for processing video data to identify video clips of interest. In some embodiments, a video review system, such as the video review system 120, may identify video clips of interest as sequences of frames containing a specified amount of motion. In other embodiments, the video review system may identify video clips of interest as sequences containing (or not containing) representations of faces, persons, specific faces or persons, unrecognized faces or persons, or other objects; sequences containing representations of certain actions or activities (e.g., fans brawling in the stands, vehicles running red lights, malfunctioning equipment, etc.), anomalous sequences, and so forth.

FIG. 2A illustrates an example of a frame 200 that the video review system 120 can capture and divide into cells 202 (e.g., A1, A2, . . . , I10). In this example, the cells 202 are arranged in a 9×10 grid superimposed over the frame 200. However, one of ordinary skill will understood that other numbers of cells, cell or frame shapes, cell or frame sizes, and so forth, can be used, without departing from the scope of the present technology. As discussed in further detail below, motion detection can be performed using subdivided units of the cells 202 that can represent the smallest collection of adjacent pixels for which motion is detected (referred to herein as a sub-cell or a block of (one or more) pixels). As discussed in greater detail below, the motion associated with a particular sub-cell can be identified by calculating absolute differences (e.g., in pixel color or intensity) as between common sub-cells in adjacent frames (e.g., on a frame-to-frame basis).

FIG. 2B illustrates an example of a portion 220 of the frame 200 (e.g., cells A1, A2, B1, and B2) in which the cell 202 (A1) may be further divided into sub-cells 222 (e.g., A1-0, A1-1, . . . , A1-23). The sub-cells 222 can be used to distinguish regions within the cell 202 (A1) in which motion is detected. In this example, the cell 202 (A1) can comprise twenty-four sub-cells 222. However, one of ordinary skill in the art will appreciate that any other number of sub-cells, sub-cell shapes, sub-cell sizes, and so forth, may be used to subdivide each cell 202, without departing from the scope of the present technology.

In some embodiments, calculations of motion can be determined based on changes in pixel values for a particular sub-cell across multiple frames. In this example, the sub-cells 222 may cover an area of the frame 200 that does not contain any motion. In contrast, FIG. 2C illustrates an example of a portion 240 of the frame 200 (e.g., cell 202 (D7)) in which motion is detected. In particular, FIG. 2C shows un-shaded sub-cells that include an amount of motion satisfying a threshold (e.g., the sub-cells 7, 10, 11, 13-15, 18, and 19) and shaded sub-cells that do not include an amount of motion satisfying the threshold (e.g., sub-cells 0-6, 8, 9, 12, 16, 17, and 20-23).

FIG. 2C also shows a motion vector 242 corresponding to the cell 202 (D7). In some embodiments, motion vectors, such as the motion vector 242, can be used to provide a compressed data format for storing motion data. For example, the first four bits of the motion vector 242 can represent the row of the cell 202 (D7) (e.g., "D" or "0011"), the next four bits can represent the column (e.g., "7" or "0110"), and the remaining bits can represent a bit vector corresponding to the sub-cells 222 and indicating that a given sub-cell includes an amount of motion satisfying the threshold by a value of '1' (e.g., 7, 10, 11, 13-15, 18, and 19) and that a given sub-cell does not include an amount of motion satisfying the threshold by a '0' (e.g., 0-6, 8, 9, 12, 16, 17, and 20-23). Here, motion within the cell 222 D7 may be identified at sub-cells 13, 10, 14, 18, 7, 11, 15, and 19. In some embodiments, motion vectors, such as the motion vector 242, can be associated with a respective frame that is sorted as a times-series database (that may be stored in the data store 138 and/or a remote data store accessible via the WAN 110).

Utilization of motion vectors, such as the motion vector 242, can be advantageous in that the motion of each cell 202 can be represented by a 32-bit integer, and the frame 200 can be stored in 360 bytes (i.e., 90×32-bits). In some embodiments, this format for the motion vector 242 may permit sparse data to be vastly compressed. For example, sub-cells that contain no motion may not need to be saved, and motion that activates only a single sub-cell may only consume 32-bits or 4 bytes of data.

Figure 3:
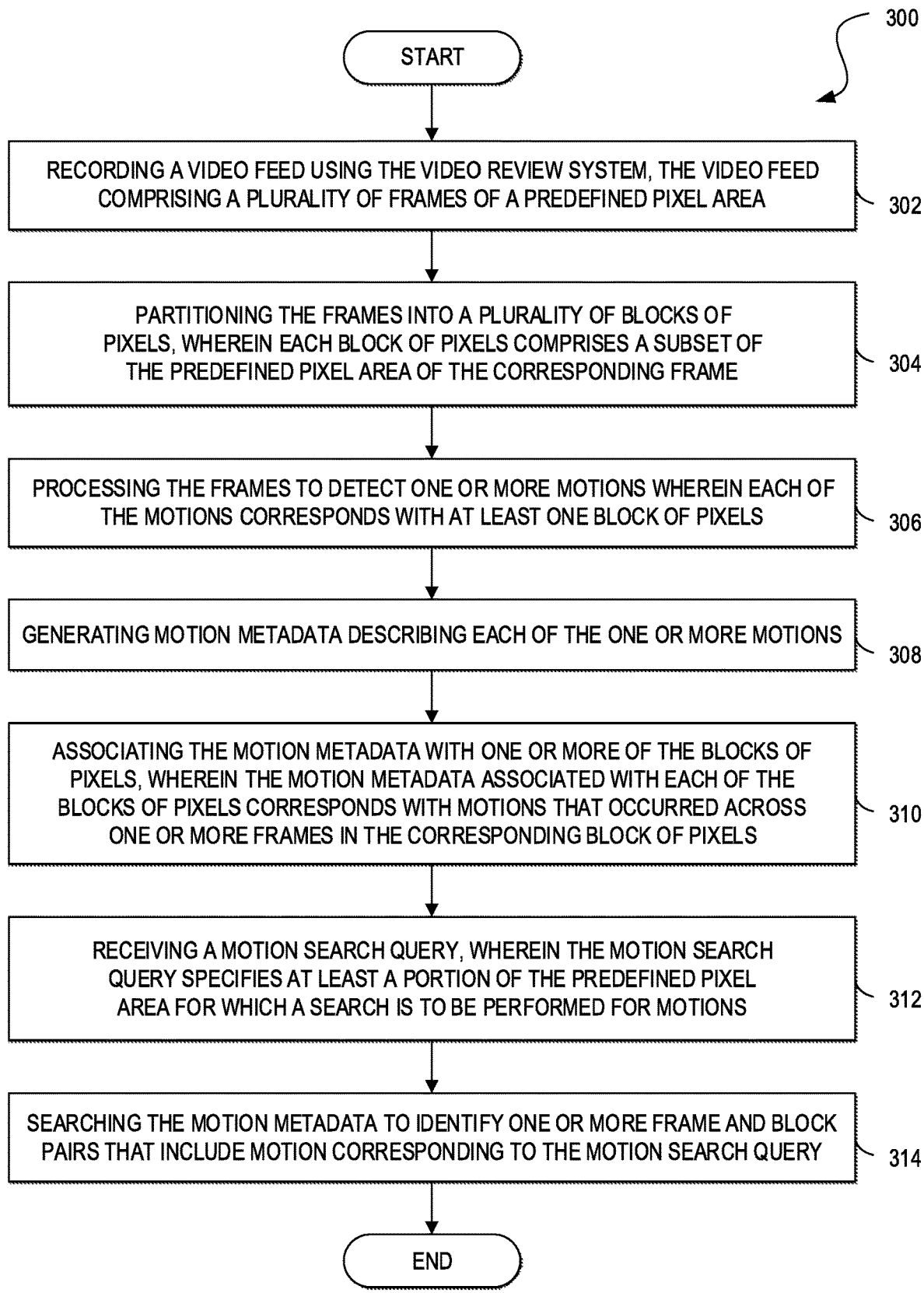
FIG. 3 illustrates a flow chart of an example of a process for identifying video clips of interest in accordance with an embodiment.

FIG. 3 illustrates a flow chart of an example of a process 300 for identifying video clips of interest, such as a video clip including an amount of motion satisfying a motion threshold. One of ordinary skill will understood that, for any processes discussed herein, there can be additional, fewer, or alternative steps performed in similar or alternative orders, or in parallel, within the scope of the various embodiments unless otherwise stated.

The process 300 may begin with step 302, in which a video feed is captured using a video review system, such as the video review system 120. In particular, cameras (e.g., the cameras 102) of the video review system 120 can capture the video feed. The video feed can include multiple image frames each of a predefined area (e.g., a predefined dimension).

At step 304, the video feed can be partitioned into a plurality of blocks of pixels, such as cells and sub-cells, as illustrated above with respect to FIGS. 2A-C. Video feed partitioning can be performed by the cameras 102, the computing devices 108, the computing devices of a cloud-based management system accessible via the WAN 110, and the like.

At step 306, the frames can be processed to detect an amount of motion satisfying a specified threshold. Each motion can be associated with at least one block of pixels (e.g., a sub-cell). As discussed above, determinations of motion can be based on a calculation of a sum of absolute differences (SAD) between individual sub-cells (also "frame subtraction"). In other embodiments, different types of background subtraction calculations can be implemented; however, one of ordinary skill will appreciate that other motion detection methods may also be used, without departing from the scope of the technology. For example, other embodiments may detect motion using temporal differencing, frame differencing, optical flow, or a combination of these methods or a combination of background subtraction and one of these methods, among others.

Temporal differencing can involve calculating the difference (at a pixel level) between successive frames to detect a moving object. Temporal differencing may be able to quickly adapt to highly dynamic scene changes but may be less successful when the object stops moving and when the object's color texture is similar to the scene (camouflage). Also, false object detection may occur when scene objects tend to move (e.g. leaves of a tree when the air is blowing).

A simple approach of temporal differencing is frame differencing, in which temporal information may be indicative of moving objects in a scene. In frame differencing, the presence of mobility can be established by calculating the difference (at the pixel level) of two successive frames.

Optical flow is the pattern of objects' motion in a scene caused by the relative motion between an observer and the scene. Optical flow can use partial derivatives with respect to spatial and temporal coordinates to calculate the motion between two frames. Optical flow may be more accurate than other approaches but can be unsuitable in situations that may require minimal computational time and/or low tolerance for noise.

At step 308, motion metadata can be generated based on the one or more motions detected at step 306. As discussed above, motion metadata may be generated as a motion vector, such as the motion vector 242, to describe various attributes associated with the motion. Such attributes can include indications of time, cell location, sub-cell location, intensity, and so forth.

Next, at step 310, the motion metadata can be associated with one or more frames and/or one or more specific blocks of pixels within a respectively associated frame. As discussed in further detail below, the association of motion metadata with image frames can facilitate the convenient searching of video metadata within a region of the frame specified after the video feed has been recorded.

The process 300 may proceed to step 312 in which a motion search query may be received, such as from a user or system administrator. The motion search query can be received by a search module (e.g., the search module 126) that is configured to access a data store for motion metadata, such as the data store 138 or a remote data store accessible via the WAN 110.

Although the format of the motion search query can depend on the desired implementation, in some embodiments, the motion search query can contain information that defines at least a portion of the predefined pixel area for which the desired search is to be performed. For example, the motion search query can take the form of a bounded area defining at least a portion of the image frame across which all of the video content is to be searched.

In some embodiments, the motion search query can contain indications of boundaries within the video feed. For example, the motion search query may specify an area of the frame, in conjunction with start and stop times (corresponding with different frames or frame numbers in the feed), for which the search is to be performed. Other search parameters can include, searches based on event length and/or intensity (e.g., to filter out sudden increases/decreases in ambient lighting). One of ordinary skill in the art will understand that other user-specified criteria may alternatively or additionally be included in the motion search query without departing from the scope of the present technology.

The process 300 may conclude at step 314 in which the motion metadata can be searched to identify one or more frames that include motion. In some embodiments, the motion search query may return more specific information such as identifications of a specific block of pixels that include motion events of interest.

Further to the example provided above with respect to FIGS. 2A-2C, if a user specifies an area of a frame that includes a specific sub-cell, the search could be performed across all sub-cells corresponding to the user-specified area, across all frames. In this example, because motion has been identified in those blocks of pixels, the associated frames and/or blocks may be returned to the user for further review.

FIGS. 4A-4E illustrate examples of graphical user interfaces for a video review system, which can be examples of implementations of the management dashboard 130 of the video review system 120. Although FIGS. 4A-4E show the graphical user interfaces as pages of a web-based client application displayed in a browser executing on a large form-factor general purpose computing device (e.g., server, workstation, desktop, laptop, etc.), the principles disclosed in the present disclosure are widely applicable to other types of client applications (e.g., standalone desktop applications, mobile applications or "apps," etc.) and client computing devices of other form factors, including tablets, smart phones, wearable devices, or other electronic devices capable of connecting to a local server of the video review system and/or a remote server of the video review system accessible via the WAN 110 and including input/output components to enable a user to interact with the video review system. One of ordinary skill will also understand that the graphical user interfaces of FIGS. 4A-4E are but one example of a user interface for the video review system. Other embodiments may include a fewer number or a greater number of elements.

Figure 4A:
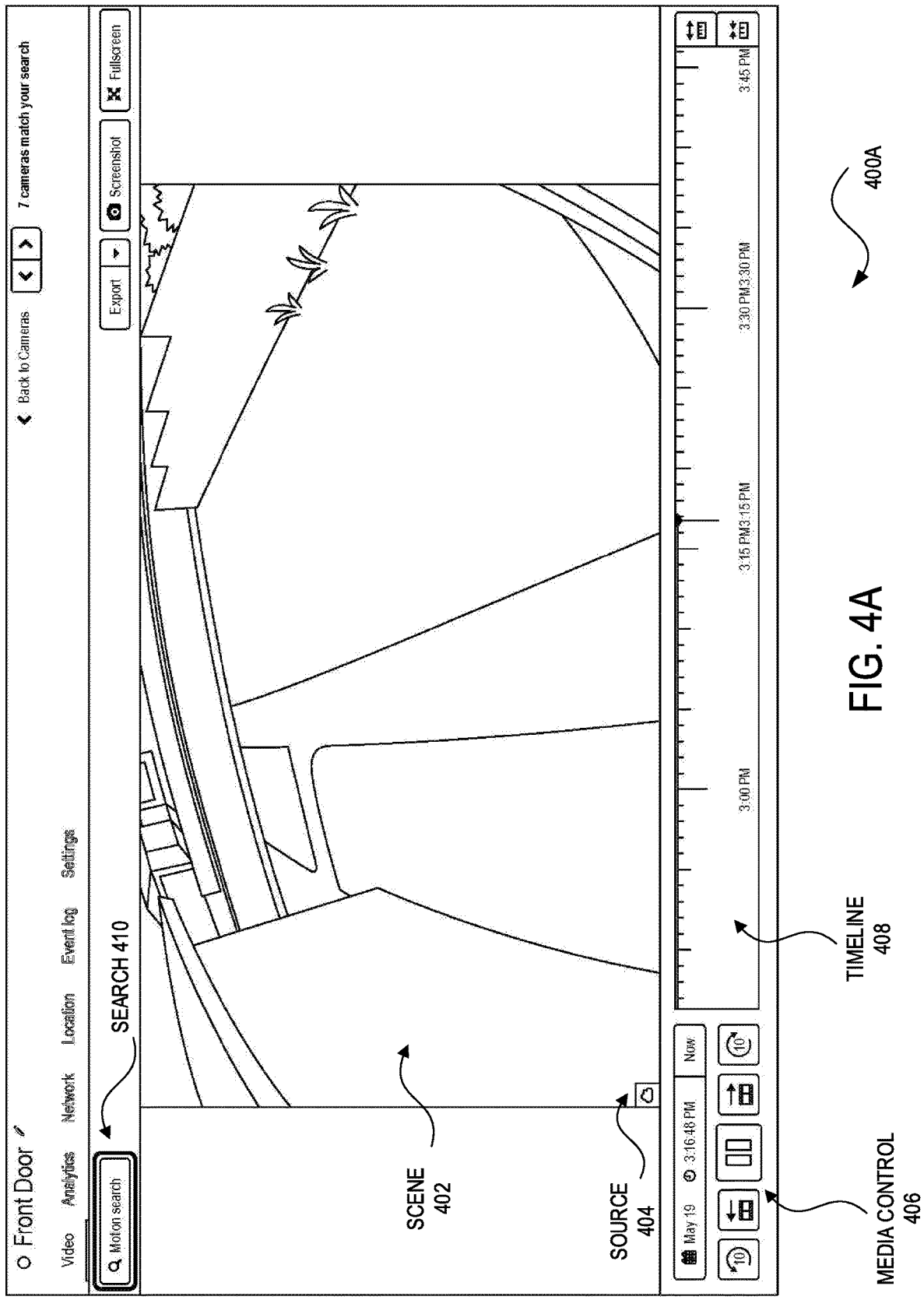
FIGS. 4A-4E illustrate examples of graphical user interfaces for a video review system in accordance with some embodiments.

FIG. 4A illustrates an example of a graphical user interface 400A of a landing page for the video review system. In some embodiments, the landing page may be integrated with the user interface of a network management system, such as the Cisco Meraki® dashboard. This can enable the video review system to take advantage of the features of the Meraki® dashboard, such as centralized management of networks and devices, zero-touch deployment, automatic software updates and patches, and so forth. This can also eliminate the need for additional single-purpose hardware and software, such as dedicated video review system servers, Network Video Recorders (NVRs), and the like.

The graphical user interface 400A can include video data of a scene 402, a source indicator user interface element 404, media control user interface elements 406, a timeline user interface element 408, and a search user interface element 410. The scene 402 may be a video feed captured by a camera (e.g., the camera 102) of the video review system. The source indicator user interface element 404 can indicate whether the video data currently being presented is stored locally or remotely.

The media control user interface elements 406 can comprise buttons enabling a user to control the presentation of video. The top user interface elements of the media control user interface elements 406a can enable user to select a particular video for review, such as by a calendar pop-up menu to select a video associated with a particular date and/or time, a drop-down menu presenting a list of videos, and so forth. At the bottom and from left to right, the media control user interface elements 406 can comprise buttons that, upon selection, enable a user to rewind a currently presented video by a specified time (e.g., ten seconds), skip to a previous video, pause the video, skip to the next video, and fast forward the video by the same or a different specified time (e.g., 10 seconds, 30 seconds, etc.).

The timeline user interface element 408 can provide an indication of how much of a currently presented video has elapsed. The timeline user interface element 408 can also enable a user to skip to a specific section of the currently presented video by selecting (e.g., clicking, tapping, etc.) a specific time of the timeline user interface element 408. In some embodiments, the timeline user interface element 408 can also include graphical elements denoting sections of the currently presented video that contain interesting events, such as sections containing motion, persons or other objects of interests, anomalies, and so forth.

Figure 4B:
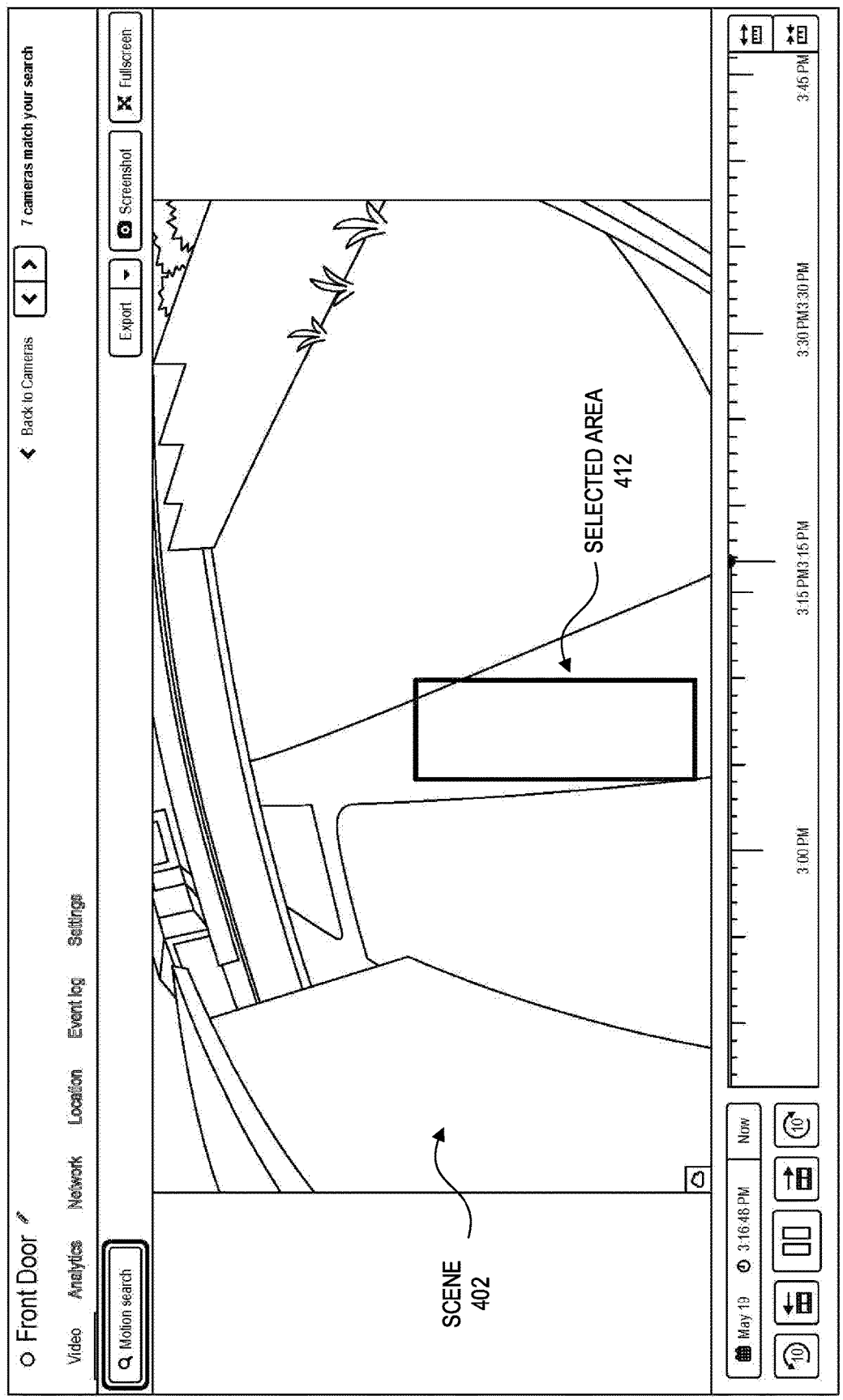

The search user interface element 410 can comprise a button that, upon selection, navigates a user to a graphical user interface for searching interesting events included in the video, such as shown in FIG. 4B. In particular, FIG. 4B illustrates an example of a graphical user interface 400B of a search module (e.g., the search module 126) for querying a data store (e.g., the data store 138 or a remote data store, such as a remote data store accessible via the WAN 110) to identify video clips containing motion. As discussed above, the graphical user interface 400B can enable a user to select a particular portion of the scene 402 to search for motion, such as by the user manipulating a virtual or physical pointer (e.g., mouse cursor, finger, stylus, etc.) to select an area of interest (e.g., selected area 412) at which the search module can focus its search.

Figure 4C:
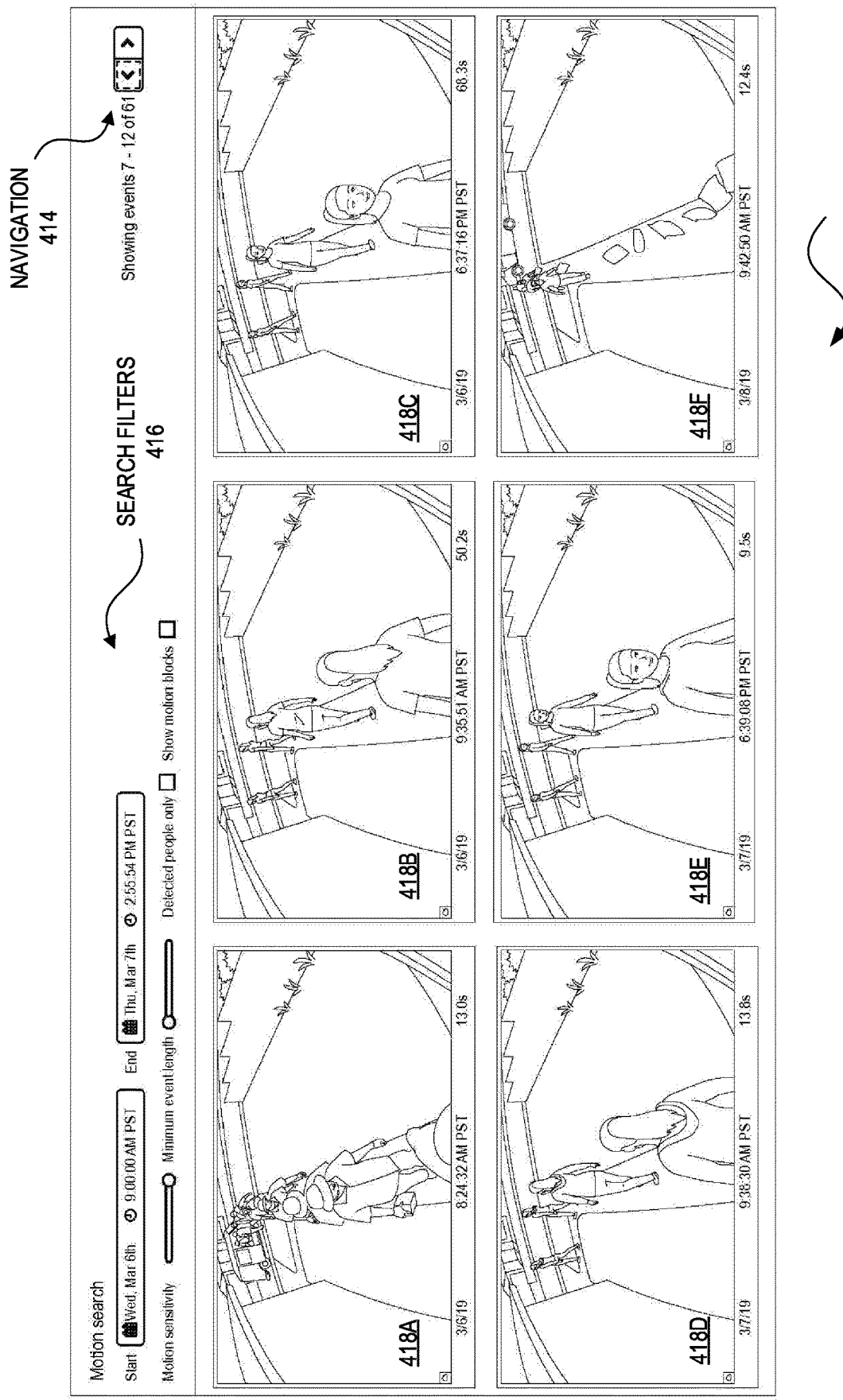

FIG. 4C illustrates an example of a graphical user interface 400C representing the search results from a video search query of interesting events (e.g., a motion search query), such as video clips containing an amount of motion satisfying a specified threshold. The graphical user interface 400C can include navigation control user interface elements 414, search filter user interface elements 416, and motion recap images 418A-E (collectively, 418). The navigation control user interface elements 414 enable a user to navigate back to a previous set of motion recap images 418 or advance to the next set of motion recap images 418.

The search filter user interface elements 416 can enable the user to filter the search results of the video search query by a specified start time and date, end time and date, an amount of motion sensitivity (e.g., motion intensity), video clip length, video clips including persons, and video clips with superimposed motion cells and/or sub-cells (e.g., blocks of pixels). This can allow the user to review the most relevant or interesting contents of a set of video clips at once and substantially increases the efficiency of video review.

The motion recap images 418 can represent the search results of the video search query, the six motion recap images 418 summarizing the video clips matching the search criteria specified by a user (e.g., within a specified time and date range, including an amount of motion above a specified threshold, having a minimum length, including persons, including motion blocks, etc.). The motion recap images can be generated by a motion recap image module (e.g., the motion recap image module 128) from the image data and metadata (e.g., motion, detected persons, distance (or size) of moving objects, etc.) associated with the video clips matching the search criteria. Although the motion recap images 418 are arranged in a 2×3 grid in this example, one of ordinary skill in the art will appreciate that any number of motion recap images and any arrangement may be used in other embodiments.

In this example, each motion recap image 418 can be a still image of a scene with multiple instances of a moving object superimposed or stacked onto a single frame. The first or top-most instance of the moving object can be extracted from a frame of a video clip when the moving object is closest to the camera (or the frame including the largest instance of the moving object). Alternatively or in addition, the first or top-most instance of the moving object may be extracted based on the selected area 412, such as from the frame when the moving object is closest to the camera relative to the selected area 412, the frame including the largest instance of the moving object within the selected area 412, the frame including the most complete representation of the moving object (e.g., the entire face of a person, the entire body of the person, etc.) within the selected area 412, and so forth. Alternatively or in addition, the first or top-most instance of the moving object may be extracted based on other conditions, such as from the frame when the moving object has the least amount of blur; the frame representing the mean, median, or mode in terms of the distance of the moving object from the camera, the size of the moving object from the camera, intensity of motion, dwell time (e.g., the length of time the moving object stayed at the same exact position), and so forth; and numerous other possibilities as would be known by one of ordinary skill in the art and/or discussed elsewhere in the present disclosure.

In some embodiments, the other instances of the moving object may be extracted from the frames of the video clip using a non-fixed sampling interval. For example, the motion recap image module 128 may extract the moving object from a frame based on a time threshold and an amount of overlap between instances of the moving object. In some embodiments, the motion recap image module may determine a bounding box of the moving object from frame to frame and select the next instance of the moving object to sample if the bounding box of the next instance overlaps with the previously sampled instance by less than a threshold amount. The threshold amount can be an absolute value (e.g., 0 pixels), a percentage (e.g., less than 20% of the object sampled in the previous sampled frame, etc.).

In other embodiments, the motion recap image module 128 may utilize a fixed sampling interval, such as per fixed unit of time (e.g., every 5 seconds or every $120^{th}$ frame for a video recorded at 24 frames per second (fps)), per fixed numbers of frames (e.g., 10 total frames evenly divided across the length of the video clip), and so forth.

In still other embodiments, each motion recap image 418 may comprise a sequence of still images, such as an animated Graphics Interchange Format (GIF) file. However, these embodiments may be less preferable than still motion recap images because it may be distracting and more difficult for a user to simultaneously review multiple animated images.

Figure 4D:
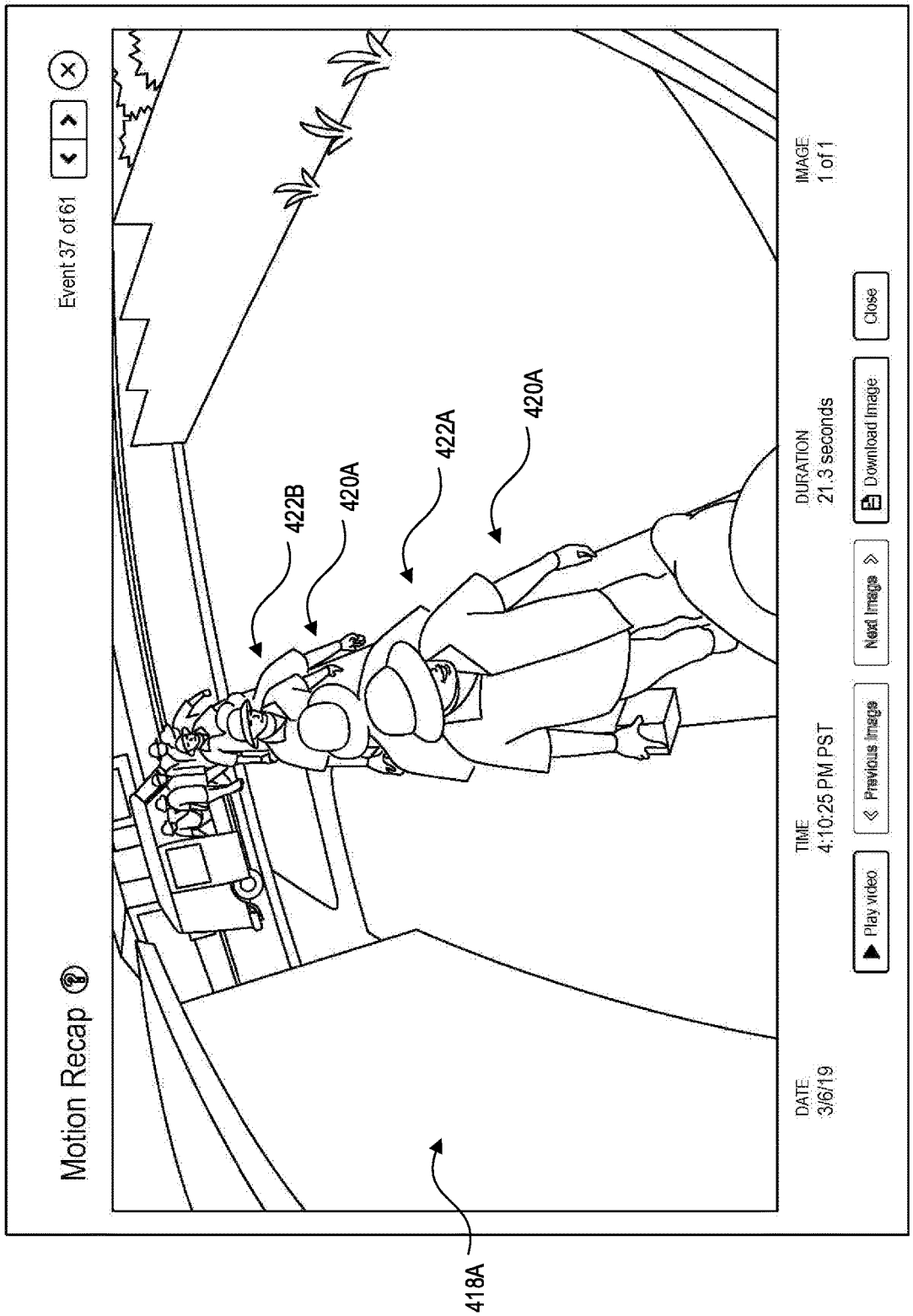

FIG. 4D illustrates an example of a graphical user interface 400D, which can be a full screen rendering of the motion recap image 418A. The motion recap image 418A can include multiple instances of the front of a moving object 420A, 420B, . . . , and 420N (e.g., a mailman) interspersed with multiple instances of the back of the moving object 422A, 422B, . . . , and 422N superposed or stacked on a single still image. The video review system can generate this arrangement with a particular frame selection or sampling strategy and a particular superimposition or stacking strategy as discussed in further detail with respect to FIG. 5 and elsewhere herein.

With a quick glance at the motion recap image 418A, a user can immediately understand the motion occurring in the video clip corresponding to the motion recap image 418A. This is an advantage over conventional video systems that only generate a thumbnail of a video clip (typically the first frame of the clip). For example, if the camera was positioned in front of a busy street, there may be dozens of video clips of pedestrians or cars traveling across the front of the user's home requiring playback of at least a portion of each video clip to see if the video clip includes motion of an object moving towards the front door.

Figure 4E:
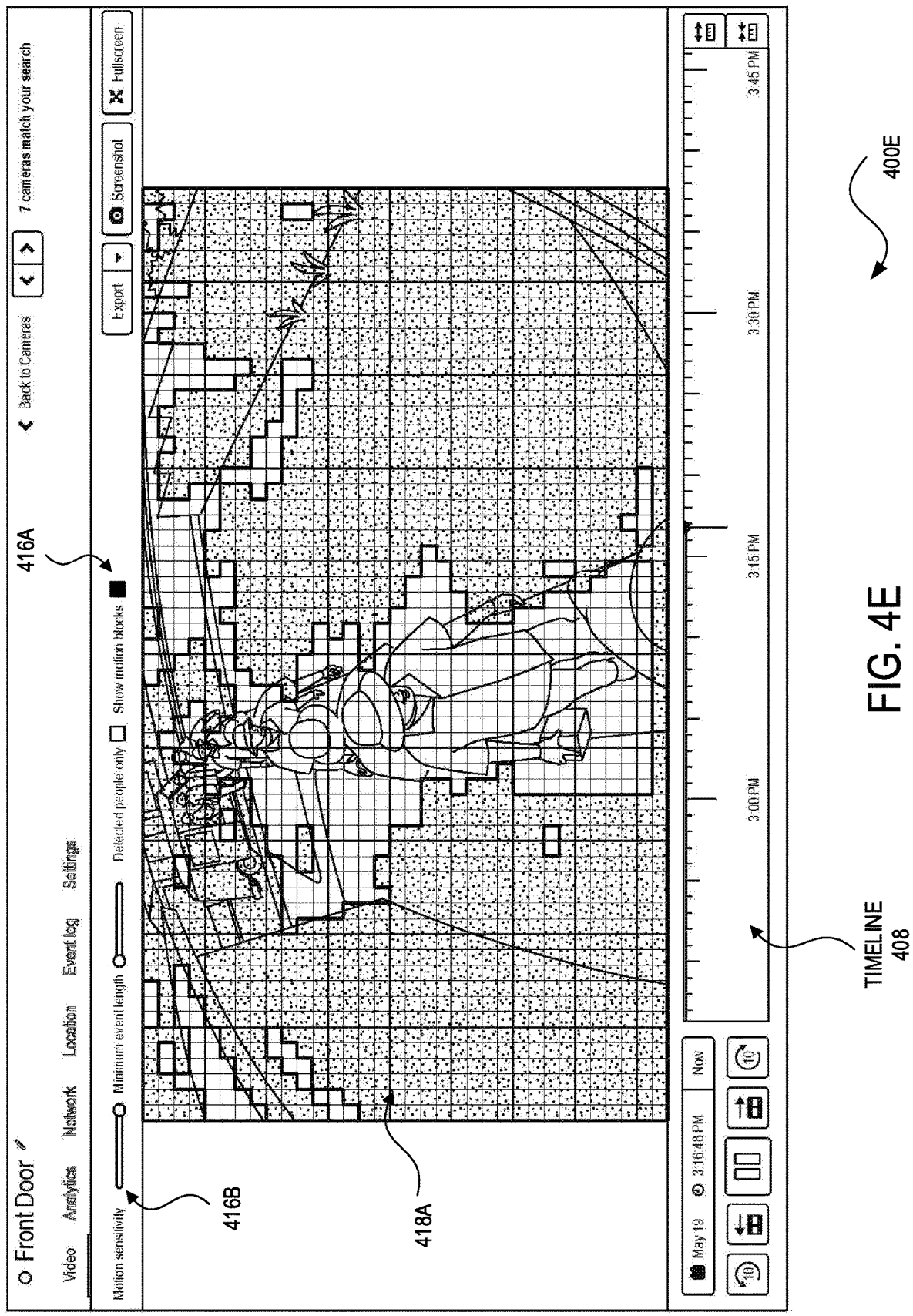

FIG. 4E illustrates an example of a graphical user interface 400E, which can be a full screen rendering of the motion recap image 418A superimposed with cells and sub-cells 430. The graphical user interface 400E can include a "Show motion blocks" user interface element 416A (e.g., a radio button or check box) for superimposing the cells and sub-cells and the "Motion sensitivity" user interface element 416B for adjusting the size of the cells to search for motion. For instance, the cells in this example are 6×4 grids of sub-cells but moving the slider of the "Motion sensitivity" user interface element 416B can adjust the size of the cells to different numbers of sub-cells. Other embodiments may use different numbers, shapes, and pixel sizes can be used for the frames, cells, and sub-cells, and some embodiments may enable users to configure these dimensions according to their own preferences based on an API, a command line interface, a settings file, or other user interface.

The graphical user interface 400E also includes the timeline user interface element 408. In some embodiments, the timeline user interface element 408 can denote which frames of the video correspond to the instances of the moving object that have been sampled to generate a motion recap image. In some embodiments, each of the instances of the moving object (e.g., the mailman) may be selectable, and upon selection of an instance, the video review system can begin playback of the video clip at the frame corresponding to the selected instance.

Figure 5:
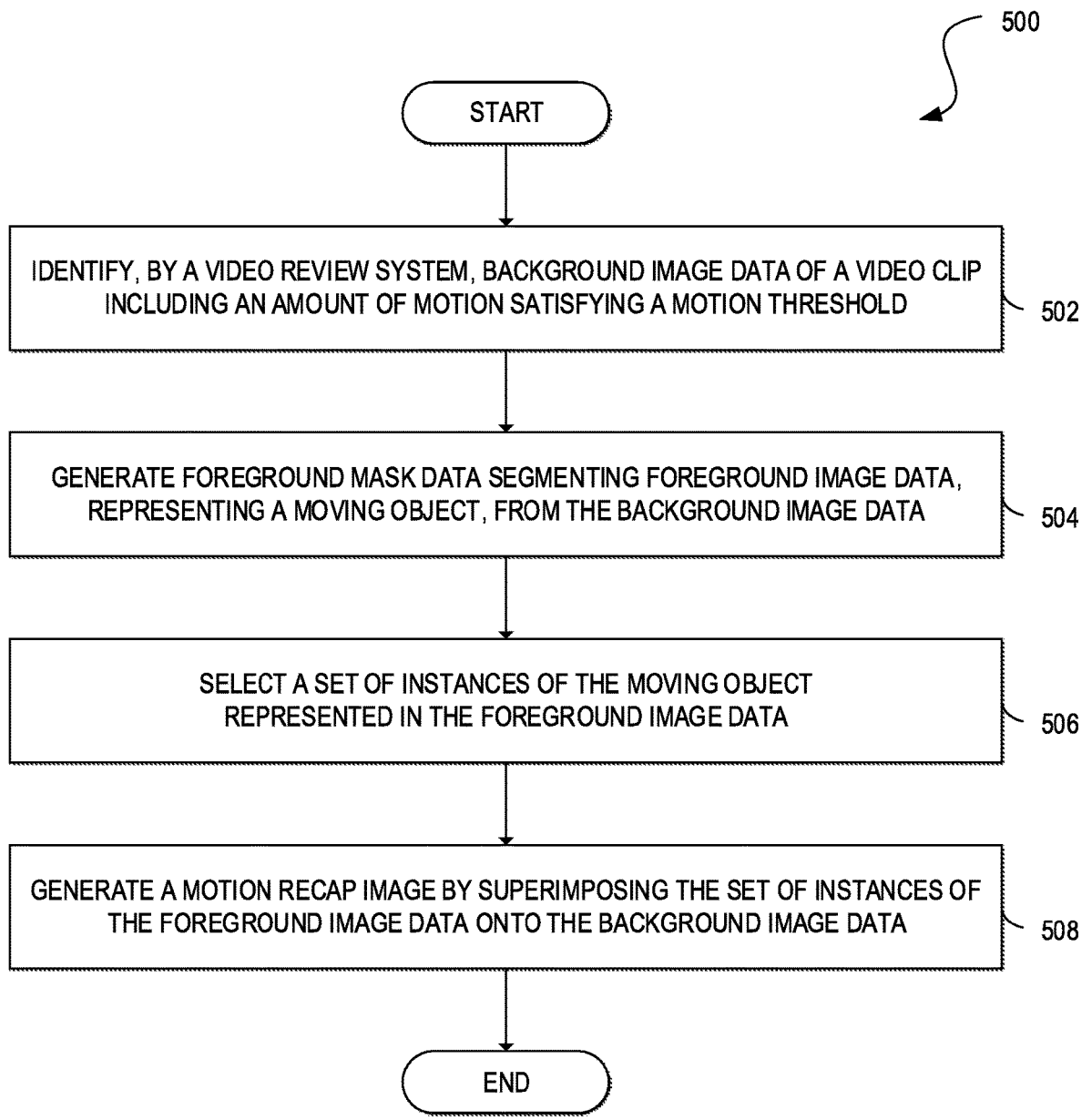
FIG. 5 illustrates a flow chart of an example of a process for generating a motion recap image in accordance with an embodiment.

FIG. 5 illustrates a flow chart of an example of a process 500 for generating a motion recap image. The process 500 may be initiated after a video review system, such as the video review system 120, receives a motion search query for video data including an amount of motion satisfying a motion threshold, identifies at least one video clip responsive to the motion search query, and prepares to generate and present, in response to the motion search query, the motion recap image to summarize the video clip for more efficient video review.

The process 500 may begin with a step 502 in which a video review system (e.g., the video review system 120) can identify background image data of a video clip including an amount of motion satisfying a motion threshold. An example approach for identifying the video clip is discussed with respect to FIG. 3 and elsewhere throughout the present disclosure. The background data may be identified using background subtraction, temporal differencing, frame differencing, and/or optical flow. In some embodiments, the video review system may utilize the Mixture of Gaussians (MOG) background/foreground segmentation algorithm. MOG was introduced in the paper, "An improved adaptive background mixture model for real-time tracking with shadow detection," by P. Kadew, Tra KuPong, and R. Bowden in 2001, which is incorporated herein by reference. MOG can model each background pixel as a mixture of K Gaussian distributions (e.g., for K=3 to 5). The weights of the mixture can represent the time proportions that those colors stay in the scene. The probable background colors may be the ones which stay longer and more static. MOG can support certain optional parameters like length of history, number of Gaussian mixtures, threshold, and so forth.

In other embodiments, other background models may be utilized to identify the background data of the video clip, such as basic models (e.g., average, median, or histogram-based), statistical models (e.g., other Gaussian models, other mixture models, hybrid models, nonparametric models, multi-kernel models, Support Vector Machines (SVMs), subspace learning models, etc.), cluster models (e.g., K-means, codebook, basic sequential clustering, etc.), neural network models, estimation models (e.g., Wiener, Kalman, Chebychev, etc.), fuzzy models, domain transform models (e.g., Fast Fourier Transform (FFT), Discrete Cosine Transform (DCT), wavelet transform, etc.), and so forth. In still other embodiments, other detection and tracking algorithms may be used, temporal differencing, temporal differencing, and optical flow, among others. One of ordinary skill will understand how to integrate these other algorithms with other aspects of the present technology without departing from the scope of the present disclosure.

At step 504, the video review system can generate foreground mask data from the video clip. This can involve applying a series of image filters or image transformations to the video clip. For example, the series of image filters or image transformation can include identifying raw foreground image data from the video clip, dilating the raw foreground image data, eroding the dilated foreground image data, performing a second dilation on the eroded foreground image data, performing blob segmentation on the second dilated foreground image data, removing small blobs from the blog segmented foreground image data, applying a Gaussian blur to the blob-segmented foreground image data with the small blobs removed, and generating the final foreground mask data from the blurred foreground image data. The foreground mask data can segment foreground image data, representing a moving object in the video clip, from the background data.

Identifying raw foreground data can include extracting a contiguous set of pixels or "blob" that differs from the pixels of the background by a certain threshold.

Dilation can widen and enhance dark areas of a selected portion of image data (e.g., raw foreground data, eroded foreground data, etc.). For example, a dilation filter can bring the pixel value (e.g., luminosity) of the selected pixels into line with the lowest value (e.g., the darkest value) of neighboring pixels (e.g., the 8 neighboring pixels in a 3×3 grid). Thus, a dark pixel can be added around dark areas and an isolated dark pixel against a brighter background may be enlarged (e.g., 1 dark pixel will be enlarged into a 3×3 dark pixel).

Erosion can widen and enhance bright areas of a selected portion of an image (e.g., dilated foreground data). For example, an erosion filter can bring the pixel value (e.g., luminosity) of selected pixels into line with the upper value (e.g., the brightest value) of neighboring pixels. Thus, a bright pixel can be added round bright areas and an isolated dark pixel against a brighter background may be "deleted."

Blobs are regions of image data in which some properties (e.g., brightness, color, etc.) are constant or approximately constant. The pixels in a blob can be the same or similar according to one or more specified metrics. A blob segmentation filter can identify blobs from a selected portion of an image (e.g., second dilated foreground data). A small blob filter can remove blobs of a size below a size threshold from a selected portion of image data (e.g., blog-segmented foreground data).

A Gaussian blur can "soften" the edges of a selected portion of image data (e.g., blog-segmented foreground data with small blobs removed). Softening to involve altering the alpha or transparency of the edges of the foreground blobs or blending background and foreground image data (instead of substituting a background pixel with a foreground pixel altogether). For example, applying a Gaussian blur can average the pixel values of selected pixels to the average of all pixel values within a specified radius.

At step 506, the video review system can select or sample a set of instances of the foreground image data from the video clip. In some embodiments, the video review system may utilize non-fixed sampling for selecting the instances. The sampling can be based on a time threshold and an amount of overlap between instances of the moving object. In some embodiments, the video review system may calculate a bounding box of the moving object across the video clip. For example, given a first selected or sampled frame (i.e., a previous selected or sampled frame) with a first bounding box (i.e., a previous bounding box) and a first timestamp (i.e., a previous timestamp), the video review system may select or sample the next frame (i.e., a current frame) when the difference between the timestamp of the next frame (i.e., a current timestamp) and the first timestamp (i.e., the previous timestamp) is within the time threshold and when the amount of overlap between the bounding box encompassing the moving object in the next frame (i.e., a current bounding box) and the first bounding box (i.e., the previous bounding box) is within the overlap threshold. The overlap threshold may be one or more absolute values (e.g., less than 100 pixels×100 pixels) or a relative value (e.g., less than 10% overlap). In some embodiments, the time threshold and overlay threshold (and generally any threshold discussed herein) may be configurable via an API, a command line interface, a settings file, or other user interface.

The process 500 may conclude at step 508 in which the video review system can generate a motion recap image by stacking the set of instances of the foreground data and the background data. In some embodiments, the video review system may order the stack based on an estimated distance of the moving object from the camera or the size of the moving object in the image or video frame, the distance of the moving object or the size of the object from the selected area 412, the distance of the moving object or the size of the object from the center of the image or video frame, and so forth. For example, FIG. 4D shows how a distance-based stacking approach (in combination with temporal and overlap thresholding) can be used to interleave the front-facing instances 420 and the back-facing instances 422 of the mailman.

Figure 6A:
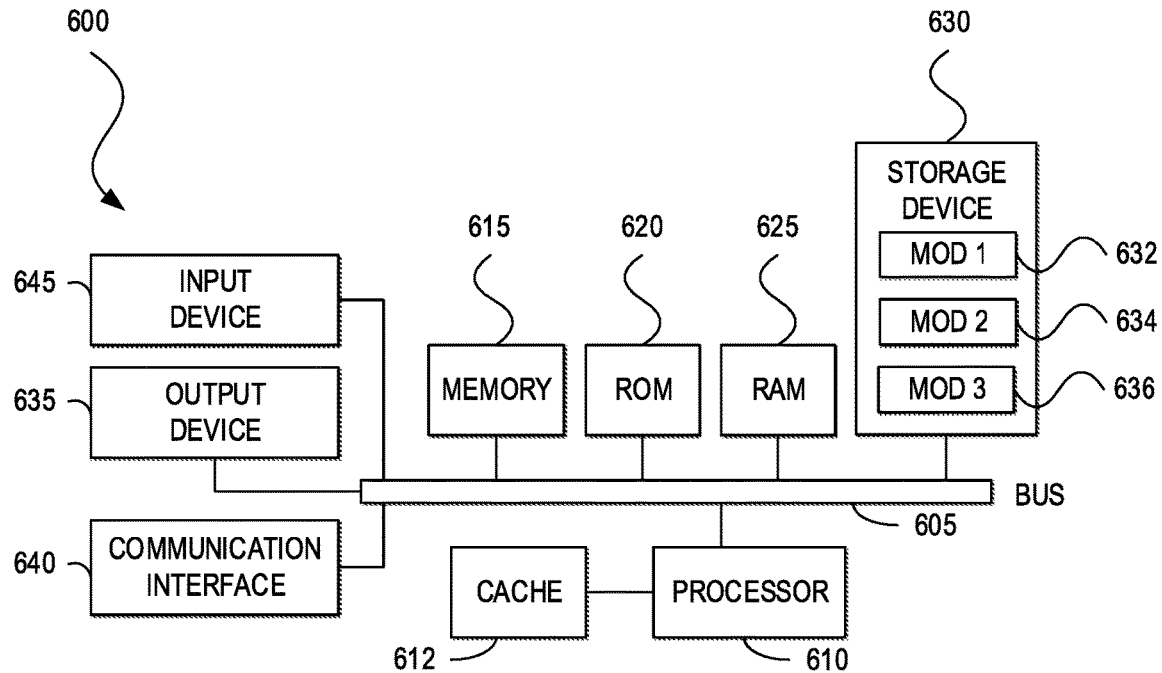
FIGS. 6A-6B illustrate block diagrams of examples of computing systems in accordance with some embodiments.
Figure 6B:
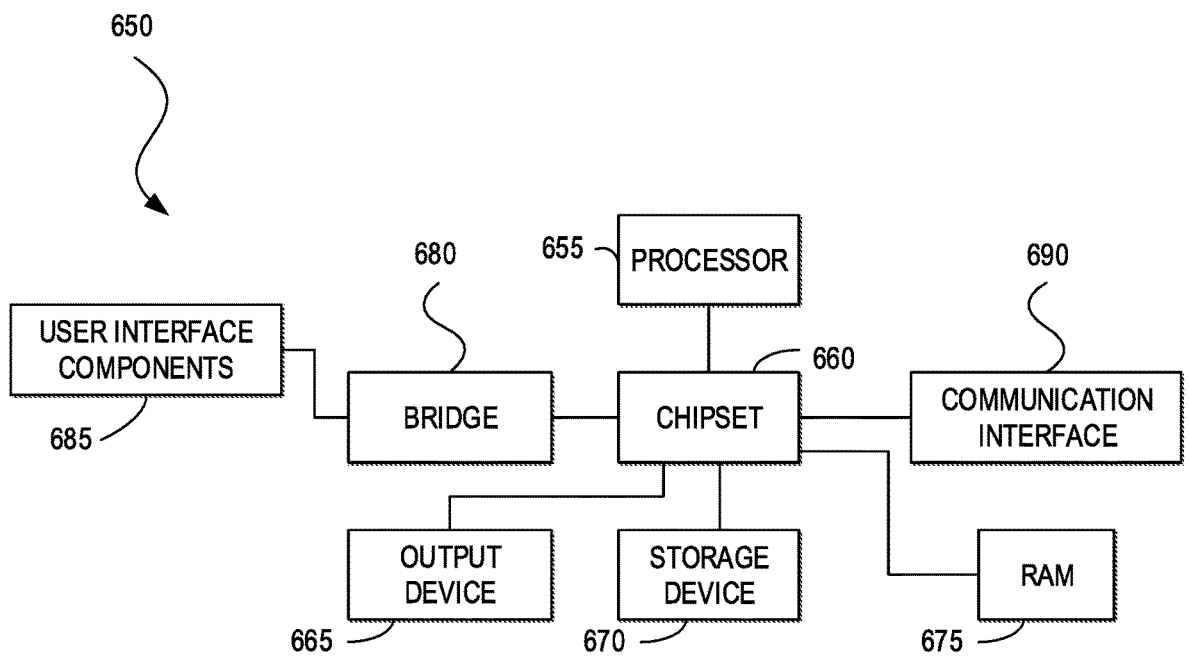

FIG. 6A and FIG. 6B illustrate systems in accordance with various embodiments. The more appropriate system will be apparent to those of ordinary skill in the art when practicing the various embodiments. Persons of ordinary skill in the art will also readily appreciate that other systems are possible.

FIG. 6A illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, solid state media, and other suitable storage media. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless Local Area Networks (LANs), for broadband wireless networks, as well as personal area networks. Some applications of the methods for generating, displaying, and using the technology disclosed herein can include receiving ordered datasets over the physical interface or be generated by the machine itself by the processor 655 analyzing data stored in the storage device 670 or the RAM 675. Further, the computing system 650 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   partitioning a video clip into a plurality of blocks of pixels;
   identifying, by a video review system, background image data from the plurality of blocks of pixels of the video clip including an amount of motion satisfying a motion threshold;
   generating, by the video review system, foreground mask data segmenting foreground image data, representing a moving object in the video clip, from the background image data;
   selecting a set of instances of the moving object represented in the foreground image data; and
   generating a motion recap image by superimposing the set of instances of the moving object represented in the foreground image data onto the background image data.

2. The computer-implemented method of claim 1, further comprising:
   receiving a motion search query requesting for video data including the amount of motion satisfying the motion threshold;
   determining the video clip is responsive to the motion search query; and
   presenting the motion recap image in response to the motion search query.

3. The computer-implemented method of claim 2, further comprising:
   determining one or more additional video clips are responsive to the motion search query;
   generating one or more additional motion recap images each corresponding to the one or more additional video clips; and
   presenting the motion recap image and the one or more additional motion recap images concurrently in response to the motion search query.

4. The computer-implemented method of claim 1, wherein generating the foreground mask data includes:
   extracting raw foreground image data from the video clip by subtracting the background image data from one or more frames; and
   applying the one or more image filters to the raw foreground image data.

5. The computer-implemented method of claim 4, wherein the one or more image filters include a dilation filter, an erosion filter, a blob segmentation filter, a small blob filter, or a Gaussian blur.

6. The computer-implemented method of claim 1, wherein the set of instances of the moving object is selected based on non-fixed sampling.

7. The computer-implemented method of claim 6, further comprising:
   determining that a current timestamp of a current frame is within a time threshold of a previous timestamp of a previously selected frame;
   determining that a current bounding box of the current frame overlaps with a previous bounding box of the previously selected frame; and
   selecting the current frame as one of the set of instances of the moving object represented in the foreground image data.

8. The computer-implemented method of claim 1, further comprising:
   determining a distance to the moving object represented in each of the set of instances; and
   determining an order for superimposing each instance of the set of instances based on the distance to the moving object represented in each of the set of instances.

9. The computer-implemented method of claim 8, wherein the distance to the moving object represented in each of the set of instances is measured from a camera capturing the video clip.

10. The computer-implemented method of claim 8, wherein the distance to the moving object represented in each of the set of instances is measured from a center of a frame of each of the set of instances.

11. The computer-implemented method of claim 1, wherein the motion recap image is generated locally at where the video clip is captured.

12. The computer-implemented method of claim 1, further comprising:
receiving a selection of one of the set of instances of the moving object in the motion recap image; and
presenting the video clip at a timestamp corresponding to the selection.

13. A system, comprising:
one or more processors; and
memory including instructions that, when executed by the one or more processors, cause the system to:
receive a motion search query requesting for video data including an amount of motion satisfying a motion threshold;
identify a video clip that is responsive to the motion search query;
partition the video clip into a plurality of blocks of pixels;
identify background image data of the plurality of blocks of pixels of the video clip;
generate foreground mask data segmenting foreground image data, representing a moving object in the video clip, from the background image data;
select a set of instances of the moving object represented in the foreground image data;
generate a motion recap image by superimposing the set of instances of the moving object represented in the foreground image data onto the background image data; and
present the motion recap image in response to the motion search query.

14. The system of claim 13, further comprising instructions that, when executed, further cause the system to:
determine one or more additional video clips are responsive to the motion search query;
generate one or more additional motion recap images each corresponding to the one or more additional video clips; and
present the motion recap image and the one or more additional motion recap images concurrently in response to the motion search query.

15. The system of claim 13, wherein the instructions to generate the foreground mask data include causing the system to:
extract raw foreground image data from the video clip by subtracting the background image data from one or more frames; and
apply one or more image filters to the raw foreground image data,
wherein the one or more image filters include a dilation filter, an erosion filter, a blob segmentation filter, a small blob filter, or a Gaussian blur.

16. The system of claim 13, wherein the motion recap image is generated locally at where the video clip is captured.

17. A non-transitory computer-readable storage medium having stored therein instructions that, when executed by one or more processors of a system, cause the system to:
receive a motion search query requesting for video data including an amount of motion satisfying a motion threshold;
identify a video clip that is responsive to the motion search query;
partition the video clip into a plurality of blocks of pixels;
identifying background image data of the plurality of blocks of pixels of the video clip;
generate foreground mask data segmenting foreground image data, representing a moving object in the video clip, from the background image data;
select a set of instances of the moving object represented in the foreground image data;
generate a motion recap image by superimposing the set of instances of the moving object represented in the foreground image data onto the background image data; and
present the motion recap image in response to the motion search query.

18. The non-transitory computer-readable storage medium of claim 17, wherein the set of instances of the foreground image is selected based on non-fixed sampling.

19. The non-transitory computer-readable storage medium of claim 18, further comprising instructions that, when executed, further cause the system to:
determine that a current timestamp of a current frame is within a time threshold of a previous timestamp of a previously selected frame;
determine that a current bounding box of the current frame overlaps with a previous bounding box of the previously selected frame; and
select the current frame as one of the set of instances of the moving object represented in the foreground image data.

20. The non-transitory computer-readable storage medium of claim 17, further comprising instructions that, when executed, further cause the system to:
determine a distance to the moving object represented in each of the set of instances; and
determine an order for superimposing each instance of the set of instances based on the distance to the moving object represented in each of the set of instances.

* * * * *